(12) United States Patent
Trutna, Jr. et al.

(10) Patent No.: US 7,598,979 B2
(45) Date of Patent: Oct. 6, 2009

(54) IMAGING DEVICE WITH BLUR REDUCTION SYSTEM INCLUDING A PRIMARY ARRAY AND AT LEAST ONE NAVIGATION ARRAY

(75) Inventors: William R. Trutna, Jr., Atherton, CA (US); Peter David Cooper, Grays Point (AU)

(73) Assignee: Aptina Imaging Corporation, Grand Cayman (KY)

( * ) Notice: Subject to any disclaimer, the term of this patent is extended or adjusted under 35 U.S.C. 154(b) by 648 days.

(21) Appl. No.: 11/232,319

(22) Filed: Sep. 21, 2005

(65) Prior Publication Data

US 2007/0064144 A1 Mar. 22, 2007

(51) Int. Cl.
*H04N 5/228* (2006.01)
*H04N 3/14* (2006.01)
(52) U.S. Cl. .................. 348/208.4; 348/208.1; 348/302
(58) Field of Classification Search ........................ None
See application file for complete search history.

(56) References Cited

U.S. PATENT DOCUMENTS

| | | | |
|---|---|---|---|
| 3,650,596 A | 3/1972 | Thevenaz | |
| 4,615,590 A | 10/1986 | Alvarez et al. | |
| 4,862,277 A | 8/1989 | Iwaibana | |
| 5,155,520 A * | 10/1992 | Nagasaki et al. | 396/53 |
| 5,172,233 A * | 12/1992 | Yoshihara et al. | 348/208.1 |
| 5,534,967 A | 7/1996 | Matsuzawa | |
| 5,644,139 A | 7/1997 | Allen et al. | |
| 5,729,008 A | 3/1998 | Blalock et al. | |
| 5,774,266 A | 6/1998 | Otani et al. | |
| 5,786,804 A | 7/1998 | Gordon | |
| 5,809,346 A | 9/1998 | Fujisaki | |
| 5,978,600 A | 11/1999 | Takeuchi et al. | |
| 6,035,133 A | 3/2000 | Shiomi | |
| 6,410,900 B1 * | 6/2002 | Okamoto | 250/208.1 |
| 6,441,848 B1 * | 8/2002 | Tull | 348/208.99 |

(Continued)

FOREIGN PATENT DOCUMENTS

JP 11155096 A 6/1999

(Continued)

OTHER PUBLICATIONS

German Search Report, Application No. GB 06188335.4 dated Nov. 28, 2006.

(Continued)

*Primary Examiner*—Ngoc-Yen T Vu
(74) *Attorney, Agent, or Firm*—RatnerPrestia

(57) ABSTRACT

An imaging device having a lens focusing light from a selected scene within an optical footprint, and a substrate including a primary array and at least one navigation array which are positioned within the optical footprint. The primary array acquires a desired image of a portion of the selected scene during an integration period and the at least one navigation array acquires a series of images during the integration period, including a first and a second image having common features from the selected scene. A correlator determines location differences of the common features of the first and second images relative to the at least one navigation array and provides a displacement signal indicative of imaging device translation in two planar dimensions during an interval between the first and second images based on the location differences.

24 Claims, 13 Drawing Sheets

U.S. PATENT DOCUMENTS

| | | |
|---|---|---|
| 6,751,410 B1 | 6/2004 | Stavely |
| 7,030,356 B2 * | 4/2006 | Pain et al. ............. 250/208.1 |
| 2004/0201755 A1 | 10/2004 | Norskog |
| 2006/0119710 A1 * | 6/2006 | Ben-Ezra et al. ....... 348/208.99 |
| 2006/0274171 A1 * | 12/2006 | Wang ........................ 348/294 |

FOREIGN PATENT DOCUMENTS

| | | | |
|---|---|---|---|
| JP | 2006-350305 | * | 12/2006 |
| JP | 2007-116679 | * | 5/2007 |
| WO | WO 02/082545 A1 | | 10/2002 |
| WO | WO 2006/033045 A1 | | 3/2006 |

OTHER PUBLICATIONS

Chinese Office Action and Translation dated Apr. 3, 2009.

* cited by examiner

IMAGING DEVICE WITH BLUR REDUCTION SYSTEM INCLUDING A PRIMARY ARRAY AND AT LEAST ONE NAVIGATION ARRAY

BACKGROUND

Image blur is a common problem in photography and has a variety of causes such as motion of the subject and focusing errors. However, one of the most common causes of image blur is camera shake by the operator. Human muscles naturally tremor or shudder at frequencies generally in the range of 4-12 Hertz. When a person is holding a camera, this hand shudder causes blur in the image. Blur caused by such human tremor is particularly noticeable with long exposure times or when using a zoom/telephoto lens capable of very long focal lengths. In efforts to reduce such blur, hand-held imaging devices, such as digital cameras and camcorders, generally employ some type of image stabilization system.

Such systems typically detect motion of the imaging device in some fashion and employ a means to counteract or compensate for the detected motion in order to stabilize the image and reduce blur. For example, in still cameras, motion is typically detected through use of a pair of piezoelectric or MEMs (micro-electro-mechanical) gyroscopes. Alternatively, camcorders sometimes employ an electronic method wherein motion is detected by comparing each frame of a scene to the previous frame.

Camera phones are one of the largest and fastest growing markets worldwide. Because camera phones are small and lightweight, they are typically hard to grip and operate as a camera. As a result, images taken with camera phones are particularly prone to blur caused by hand shudder. Unfortunately, while the above described approaches are effective at reducing blur, they are not ideal for camera phones as gyroscopes are relatively large in size and frame-to-frame image comparison requires power processing capabilities not generally available in phones. Additionally, the cost of such approaches is generally prohibitive for use in camera phones and low-priced high volume imaging devices.

SUMMARY

In one aspect, the present invention provides an imaging device including a lens, a substrate including a primary array and at least one navigation array, a correlator, and a compensator. The lens is configured to focus light from a selected scene within an optical footprint. The primary array is configured to acquire a desired image of a portion of the selected scene during an integration period. The at least one navigation array is configured to acquire a series of images during the integration period including a first and a second image having common features from the selected scene, wherein the primary array and the at least one navigation array are positioned within the optical footprint. The correlator is configured to receive the series of images from the at least one navigation array, to determine location differences of the common features of the first and second images relative to the at least one navigation array, and to provide a displacement signal indicative of imaging device translation in two planar dimensions during an interval between the first and second images based on the location differences. The compensator is configured to opto-mechanically maintain a substantially fixed relationship between the selected scene and the primary and at least one navigation arrays based on the displacement signals.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
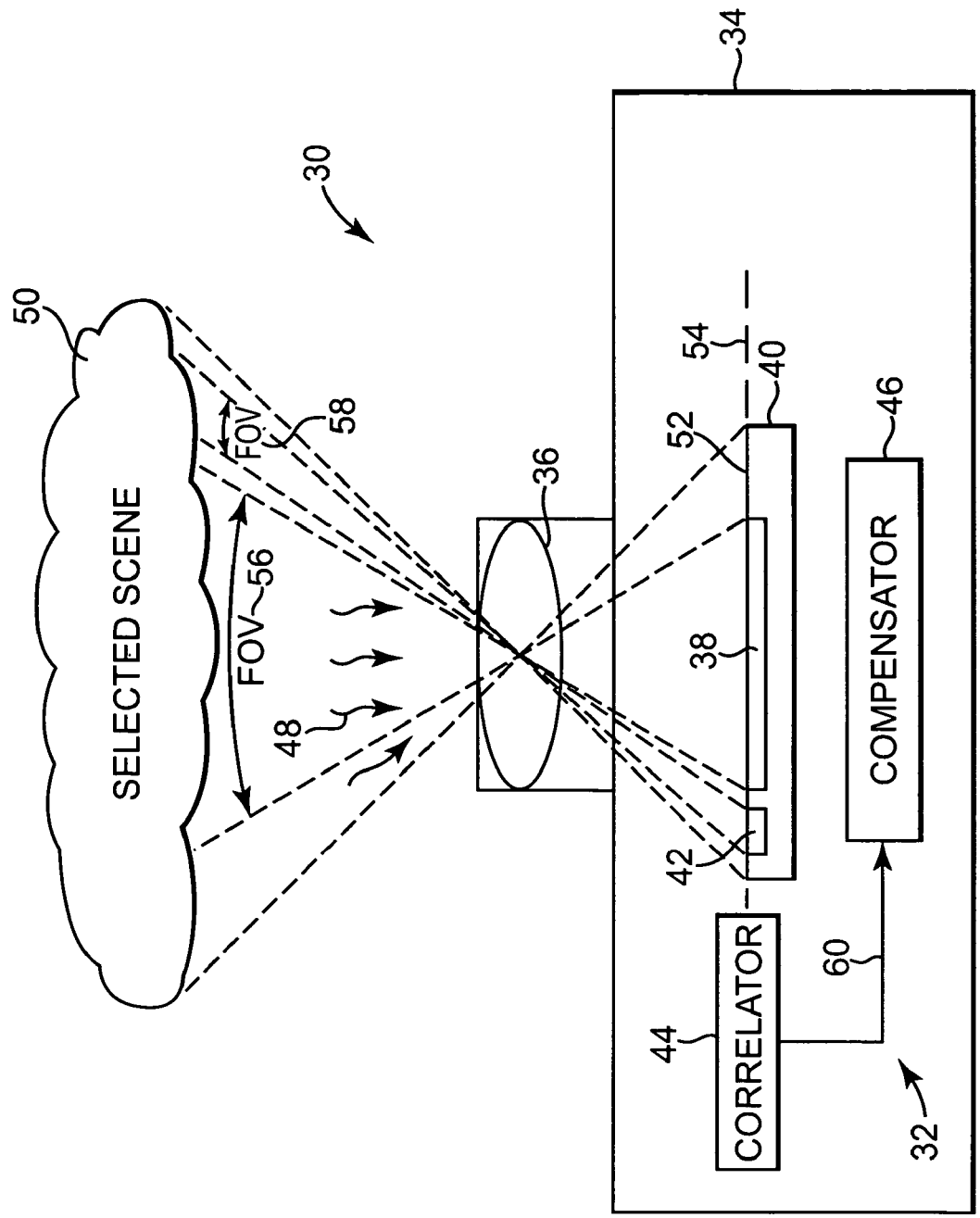
FIG. 1 is a block diagram illustrating generally one embodiment of a camera employing a blur reduction system in accordance with the present invention.

FIG. 1 is a block diagram illustrating generally one embodiment of a digital imaging device, such as digital camera 30, employing a blur reduction system 32 according to the present invention. Camera 30 includes a housing 34, an objective lens 36, and an imaging array 38 of photoelements disposed in a semiconductor substrate 40. Blur reduction system 32 includes a navigation array 42 disposed in substrate 40, a correlator 44, and a compensator 46.

In one embodiment, primary array 38 and navigation array 42 each comprise an array of CMOS (complementary metal-oxide semiconductor) type pixels. In one embodiment, primary array 38 has a higher spatial resolution (i.e. number of pixels) than navigation array 42. In one embodiment, primary array 38 comprises a 720×480 array of pixels. In one embodiment, navigation array 42 comprises a 30×30 array of pixels.

Figure 4:
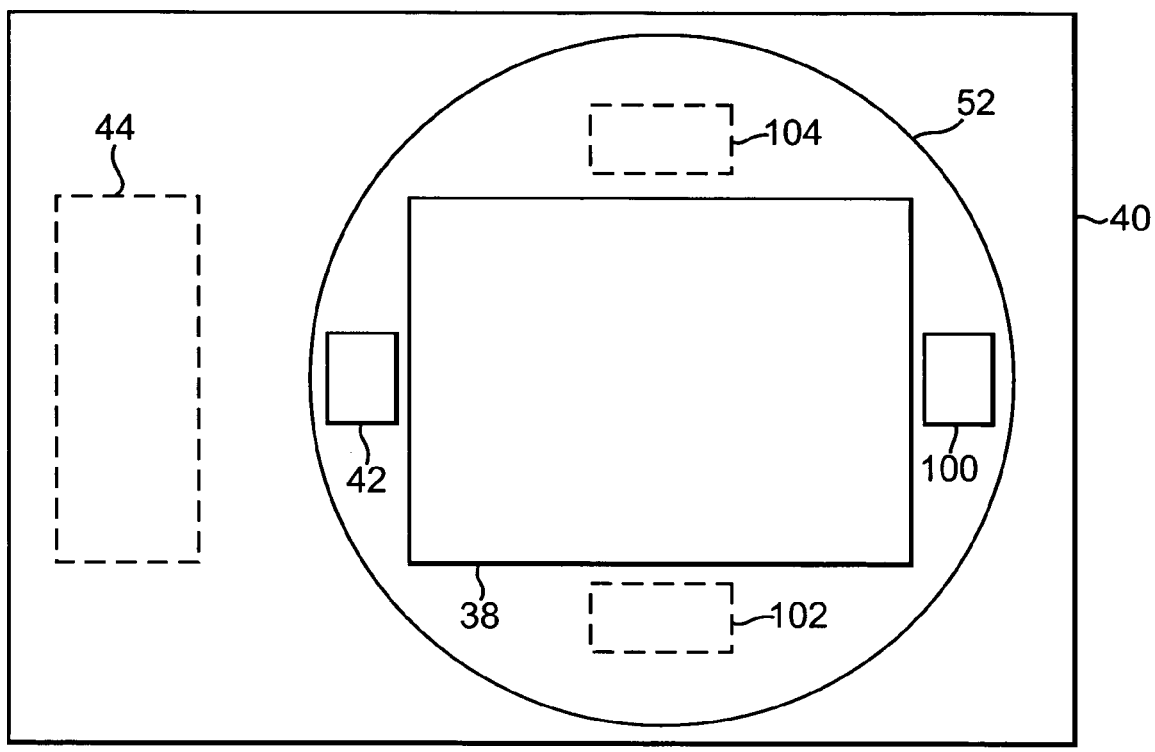
FIG. 4 is a block and schematic illustrating generally a top view of one embodiment of a semiconductor substrate employed by a camera according to the present invention.

Objective lens 36 is configured to receive and focus light 48 representative of a selected scene 50 within an optical footprint 52 on an imaging plane 54, with semiconductor substrate 40 positioned at imaging plane 54 such that primary array 38 and navigation array 42 are positioned within optical footprint 52 (see also FIG. 4). Primary array 38 is configured to acquire a desired image of a portion of selected scene 50 within a field of view (FOV) 56 of imaging array 38 during an integration period.

Figure 2:
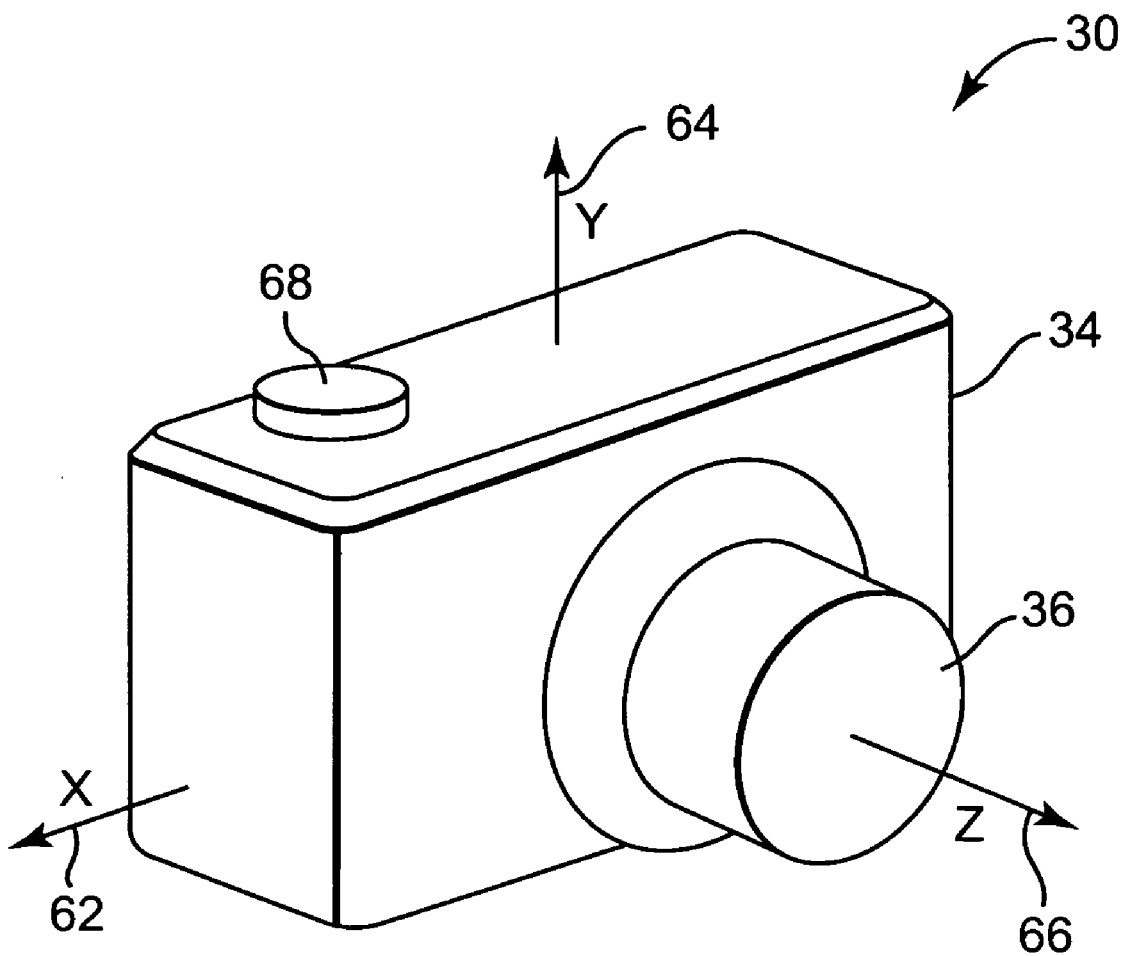
FIG. 2 is a simplified isometric view of the camera of FIG. 1.

If camera 30 shakes or otherwise moves during the exposure period, the desired image acquired by primary array 38 may be blurred. FIG. 2 is a simplified isometric view of camera 30 of FIG. 1 and describes generally motions that may be experienced by camera 30. When a photographer holds a camera by hand, it is common for natural, involuntary hand movements, or tremors, to impart motion to the camera. Such hand motion is typically oscillatory and within a frequency range of about 4 to 12 Hertz and can cause motion along and about the x-, y-, and z-axes 62, 64, and 66. This motion results in translation of light 48 representative of selected scene 50 relative to optical footprint 52, thereby causing blurring in the desired image acquired by primary array 38.

Rotation about x-axis 62 causes translation of received light 48 along y-axis 64, rotation about y-axis 64 causes translation of received light 48 along x-axis 62, and rotation about z-axis 66 causes translation of the received light along both x- and y-axes 62 and 64. Translational motion along z-axis 66 typically has a negligible effect on image sharpness because such motion is generally not pronounced and because photographs are often taken at magnification ratios that minimize the effect of such motion.

The extent of the blur introduced depends on the speed of the movement, the exposure time of the photograph, and the magnification setting of the camera, usually indicated by a focal length of camera objective lens 36. In 35-millimeter photography, a commonly cited rule of thumb states that the longest exposure time (in seconds) for which a camera can be reliably hand held is the reciprocal of the focal length of the lens (in millimeters). For example, when using a 50-millimeter lens, a camera could be hand held for exposure times of $\frac{1}{50}$ of a second or faster. Similarly, when using a 300-millimeter lens, an exposure time of $\frac{1}{300}$ second or less is typically necessary for taking a sharp photograph without the aid of a tripod.

Returning to FIG. 1, in accordance with the present image, navigation array 42 is configured to acquire a series of images during the integration period of primary array 38 with the series of images including a first and second image having common features from selected scene 50 within a FOV 58 of imaging array 38. Such common features can any object or element within selected scene such as, for example, a tree, a building structure, chair, window, etc. It should be noted that such features within FOV 58 of navigation array 42 may or may not be located with FOV 56 of primary array 38. In one embodiment, navigation array 42 begins acquiring the series of images when a shutter control button 68 of camera 30 (see FIG. 2) is partially or fully depressed by a user.

In one embodiment, navigation array 42 has a higher temporal resolution (i.e. number of images per second) than primary array 38. In one embodiment, primary array 42 has a temporal resolution of 15 frames per second (fps). In one embodiment, navigation array 42 has a temporal resolution of 100 fps. In one embodiment, navigation array 42 has a temporal resolution of 1000 fps. In one embodiment, the CMOS pixels of navigation array 42 are larger in size than the CMOS pixels of primary array 38. In one embodiment, navigation array 42 is configured to acquire black and white images to enable navigation array to collect more light energy relative to a color sensor, thereby enabling navigation array 42 to have a high temporal resolution.

Correlator 44 is configured to receive the series of images from navigation array 42 and to determine location differences of the common features of the first and second image relative to navigation array 42 (i.e. correlate the images). Based on the location differences, correlator 44 provides a displacement signal 60 indicative of translation of imaging device 30 in two planar dimensions during an interval between the first and second images. In one embodiment, displacement signal 60 includes a first displacement component ($\Delta x$) indicative of a translation along x-axis 62 and a second displacement component ($\Delta y$) indicative of translation along y-axis 64.

In one embodiment, correlator 44 is configured to determine locations differences of common features of each pair of consecutive images of the series, and to provide a displacement signal indicative of translation of imaging device 30 in the two planar dimensions during the interval between each pair of consecutive images. One example of a suitable correlation process that may employed by correlator 44 to determine translation of imaging device 30 based on the series of acquired images is described generally by FIGS. 8 through 12 below. In one embodiment, correlator 44 is disposed in semiconductor substrate 40 together with primary array 38 and navigation array 42.

Compensator 46 is configured to receive displacement signal 60 and to opto-mechanically maintain a substantially fixed relationship between selected scene 50 and optical footprint 52 based on displacement signal 60. As employed herein and as will be described in greater detail below by FIGS. 3A, 3B, and 5, opto-mechanically maintaining a fixed relationship between light 48 representative of selected scene 50 and optical footprint 52 comprises countering translation of imaging device 30 via a moveable lens element or by movement of semiconductor substrate 40 in image plane 54.

By positioning the at lest one navigation array 42 and associated correlator 44 on the same substrate with primary array 38 and sharing the imaging device lens system, blur reduction system 32 according to the present invention provides a small and cost effective alternative to conventional gyroscope-based blur reductions systems. Also, since navigation array 42 is a low-resolution array, image processing requirements for motion detection are not excessive. As such, a blur reduction system in accordance with the present invention is well-suited for use with camera phones and low-priced high-volume imaging devices. By reducing the effects of hand shudder, a camera phone employing a blur reduction system in accordance with the present invention can provide improved image quality and employ longer exposure times so as to improve performance in low light environments.

Figure 3A:
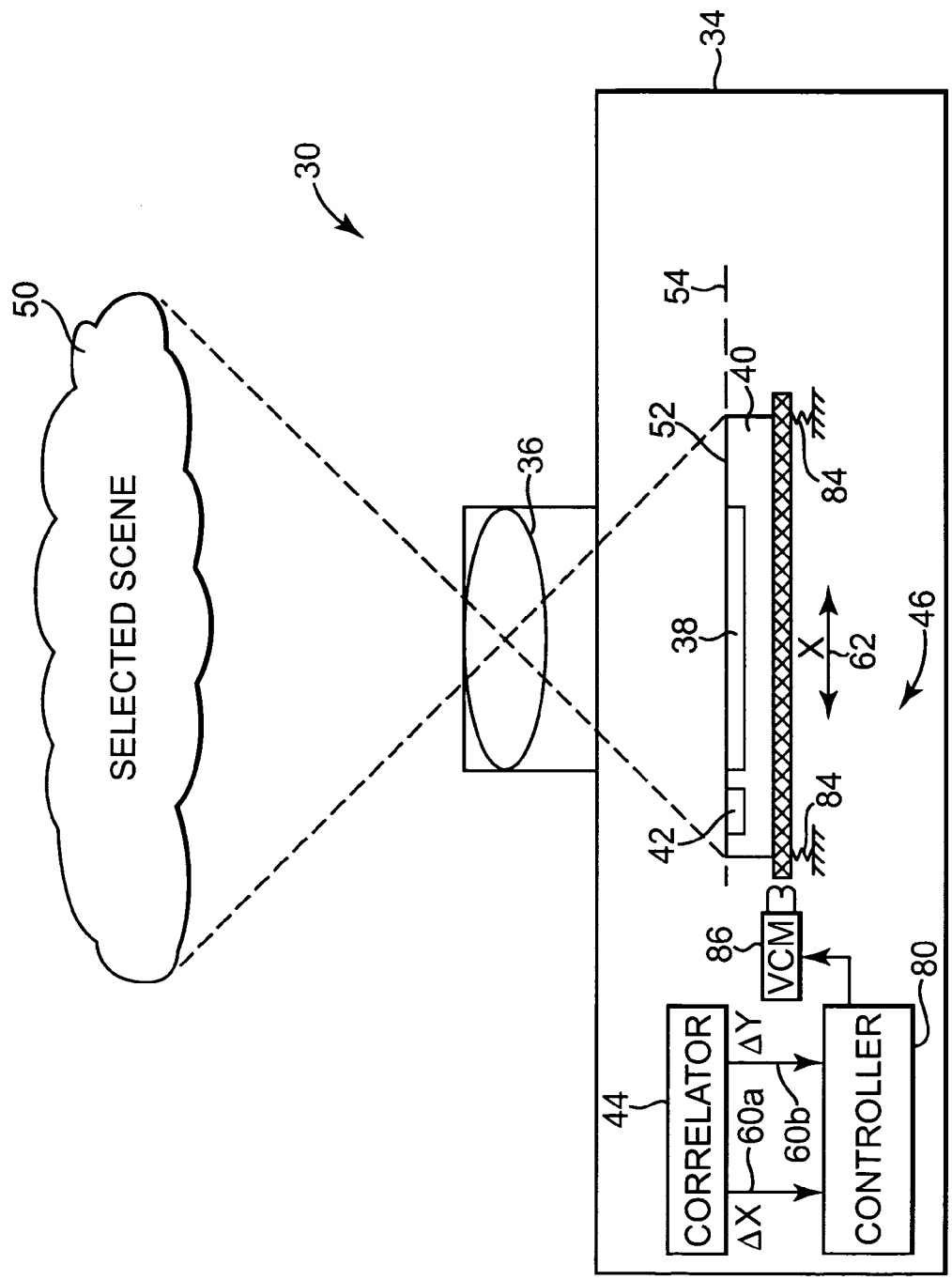
FIG. 3A is a block and schematic diagram of a camera employing a blur reduction system according to the present invention.
Figure 3B:
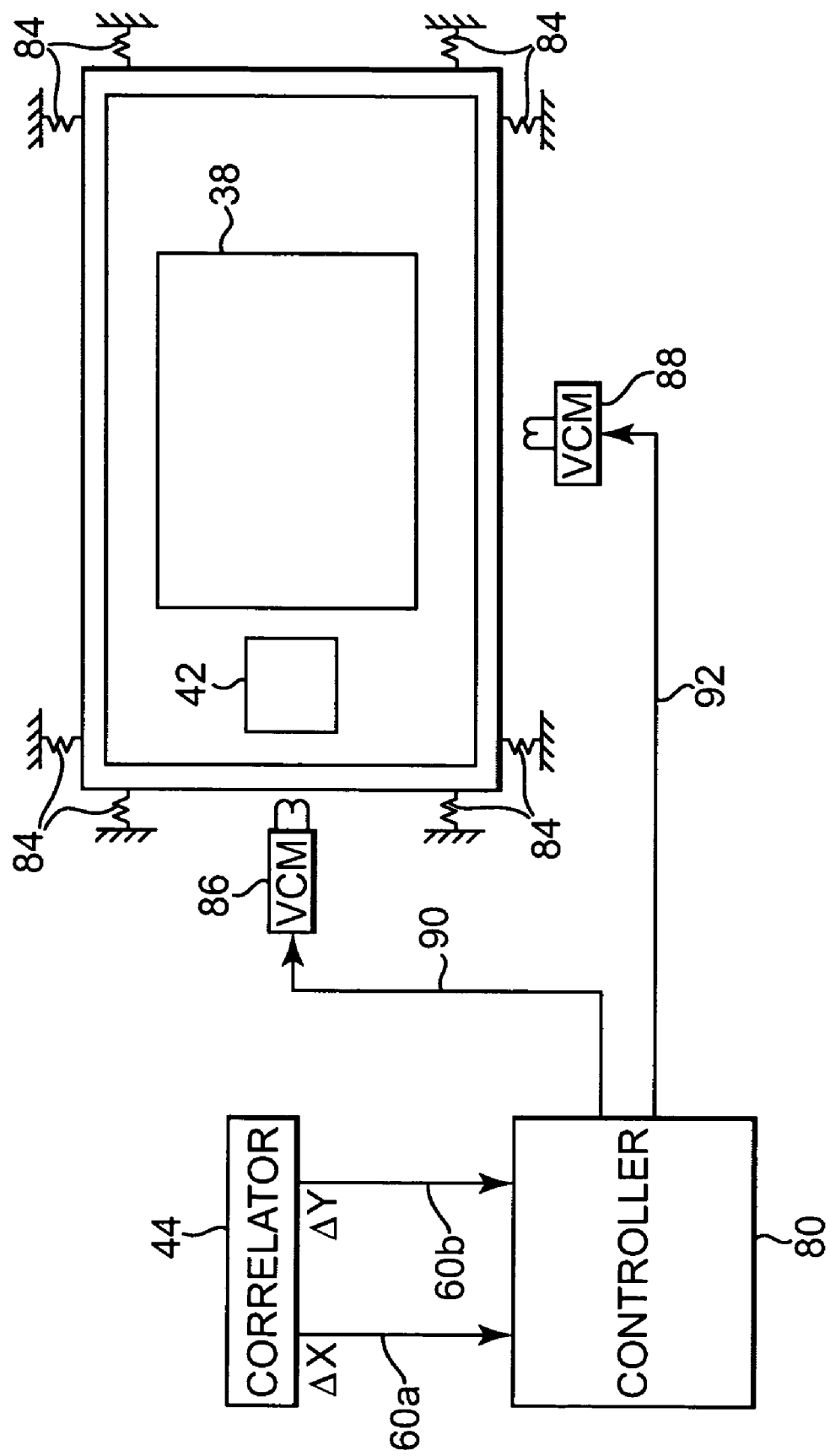
FIG. 3B is a block and schematic diagram further illustrating the camera of FIG. 3A.

FIGS. 3A and 3B are block and schematic diagrams illustrating generally one embodiment of camera 30 to the present invention, wherein compensator 46 includes a controller 80 and a flexure stage 82 which is supported by a plurality of flexure elements or support beams 84 which enable movement of flexure stage 82 along x-axis 62 and y-axis 64. Flexure stages, such as flexure stage 82, are known to those skilled in the art and are sometimes referred to as xy-flexure stages or nanopositioning stages. Compensator 46 further includes a first voice coil motor (VCM) 86 and a second VCM 88 (see FIG. 3A), with first VCM 86 configured to move flexure stage 82 along x-axis 62 and second VCM 88 configured to move flexure stage 82 along y-axis 64. Together, navigation array 42, correlator 44, and compensator 46 of blur reduction system 32 form a closed-loop system for reducing image blur in camera 30.

In one embodiment, when shutter control button 68 (see FIG. 2) is partially or fully depressed by a user, navigation array 42 begins and continues to acquire a series of features within FOV 58 (see FIG. 1) of selected scene 50 throughout the integration period of primary array 38. The series of images are received by correlator 44 to determine motion of camera 30 at least during the integration period of primary array 38.

Motion of camera 30 along and about x- and y-axes 62, 64 and about z-axis 66 (see FIG. 2) causes selected scene 50 to be translated across navigation array 42 and results in common features of selected scene 50 being at different pixels locations from one image of the series to the next. For example, movement of camera 30 down and to the left (relative to a user) causes selected scene 50 and features thereof within FOV 56 and FOV 58 to be translated up and to the right respect to primary array 38 and navigation array 42.

As such, in one embodiment, correlator 44 compares, or correlates, pairs of consecutive images of the series and determines movement of camera 30 in the interval between the pair of images based on the differences in pixel locations of features within selected scene 50 which are common to both images. In one embodiment, navigation array 42 has a temporal resolution at a rate which substantially ensures that consecutive images of the series will share at least one common feature of selected scene 50.

Based on the comparison, correlator 44 provides displacement signal 60 to controller 80 with displacement signal 60 including a first displacement component 60*a* (Δx) and a second displacement component 60*b* (Δy) respectively indicative of incremental movement of camera 30 along x-axis 62 and y-axis 64. In response, controller 60 provides compensation signals 90, 92 that respectively cause VCMs 86, 88 to move flexure stage 82 along x- and y-axes 62, 64 by distance required to offset movement of camera 30 detected by correlator 44.

By moving flexure stage 82 to counter motion of camera 30 in this fashion, blur reduction system 32 maintains a substantially fixed relationship between selected scene 50 primary array 38 at least throughout the integration period of primary array 38, thereby reducing blur of the acquired image. Also, by moving navigation array 42 along with primary array 38 on flexure stage 82, blur reduction system 32 provides direct feedback of the of the position of selected scene 50 relative to primary array 38 and feedback array 42, thereby providing improved control and blur reduction performance.

FIG. 4 is a block diagram illustrating generally a top view of semiconductor substrate 54 according to one embodiment of the present invention. As illustrated, primary array 38 is centrally positioned within generally circular optical footprint 52 with navigation array 42 being positioned adjacent to primary array 38 but still within optical footprint 52. In one embodiment, a second navigation array 100 is positioned along an axis with navigation array 42, such as x-axis 62, and opposite primary array 38. As will be described in greater detail below, second navigation array 100 provides a second series of images to correlator 44 during the integration period of primary array 38.

The benefits of using a second navigation array are twofold. First, navigation array 100 increases the effective field of view of blur reduction system 32 and, as a result, increases the likelihood that a high-contrast feature will be present for tracking. Second, as will be described in greater detail below, employing a navigation array 100 along with navigation array 42 enables blur reduction system 32 to detect and compensate for rotational movement of camera 30 about z-axis 66 (see FIG. 2). In one embodiment, to further increase the field of view of blur reduction system 32, one or more additional navigation arrays 102 and 104 are positioned within optical footprint 52. In one embodiment, correlator 44 is positioned in semiconductor substrate 40.

Figure 5:
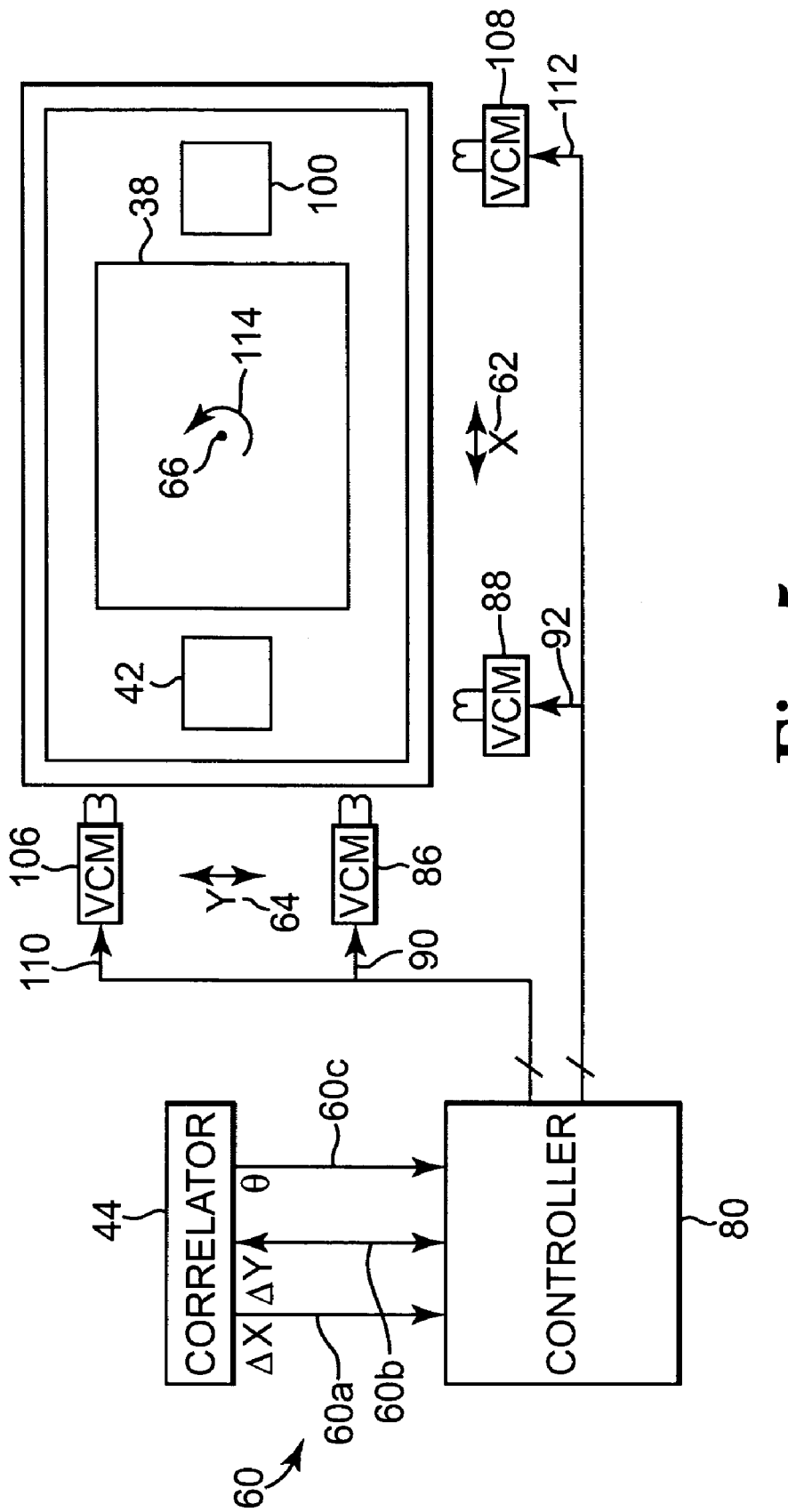
FIG. 5 is a block and schematic diagram illustrating generally one embodiment of a blur reduction system according to the present invention.

FIG. 5 is a block and schematic diagram illustrating one embodiment of blur reduction system 32 including second navigation array 100 and configured to detect and counter both translational and rotational movement of camera 30. In the illustrated embodiment, flexure stage 82 is configured to move along x- and y-axes 62, 64 and to rotate about z-axis 66. Again, such flexure stages are known in the art and are sometimes referred to as x-y-θ flexure or nanopositioning stages. Compensator 46 further includes two additional VCMs 106, 108 as compared to the embodiment illustrated by FIGS. 3A and 3B. VCMs 86, 106 are configured to move flexure stage 82 along x-axis 62, VCMs 88, 108 are configured to move flexure stage 82 along y-axis 64, and VCMs 86, 88, 106, and 108 together are configured to rotate flexure stage 82 about z-axis 66.

In one embodiment, when shutter control button 68 (see FIG. 2) is partially or fully depressed by an operator, navigation arrays 42 and 100 each begin and continue to provide a series of images to correlator 44 throughout the integration period of primary array 38. As described above, the series of images acquired by navigation arrays 42 and 100 are from separate fields of view within selected scene 50 (see FIG. 3A), thereby increasing the effective field of view of blur reduction system 32. In one embodiment, the temporal resolution navigation arrays 42 and 100 are substantially equal and the series of images provided by each array are substantially synchronized with one another.

In a fashion similar to that described above with regard to FIGS. 3A and 3B, correlator 44 compares consecutive images received from navigation array 42 and consecutive images from navigation array 100 to respectively determine translation of selected scene 50 along x- and y-axes 62 and 64 across navigation array 42 and navigation array 100. When the movement of camera 30 is substantially translational along x- and/or y-axes 62 and 64, the movement of selected scene 50 along x- and y-axes 62 and 64 relative to navigation array 42 is substantially equal to movement of selected scene 50 along x- and y-axes 62 and 64 relative to navigation array 100. In other words, the incremental movement (Δx) of selected scene 50 relative to navigation array 42 is substantially equal to the incremental movement (Δx) of selected scene 50 relative to navigation array 42, and the incremental movement (Δy) of selected scene 50 relative to navigation array 42 is substantially equal to the incremental movement (Δy) of selected scene 50 relative to navigation array 42.

However, if rotational movement of camera 30 occurs during the time interval between the pairs of consecutive images, there will be differences in the incremental movements (Δx and Δy) of selected scene 50 along x- and y-axes 62 and 64 between navigation arrays 42 and 100. For example, clockwise rotation 114 of camera 30 about z-axis 66 in the absence of translational movement will cause the incremental movements Δx and Δy of selected scene 50 relative to navigation array 42 to be substantially equal in magnitude but opposite in direction (i.e. sign) to the incremental movements Δx and Δy of selected scene 50 relative to navigation array 100.

Based on the comparisons, correlator 44 provides displacement signal 60 to controller 80 with displacement signal 60 including first and second displacement components 60a and 60b respectively indicative of incremental movements Δx and Δy of camera 30 along x- and y-axes 62 and 64, and a third displacement component 60c indicative of an angle of rotation (θ) of camera 30 about z-axis 66. In response, controller 60 provides compensation signals 90, 110 to VCMs 86, 106 and compensation signals 92, 112 to VCMs 88, 108 to move and rotate flexure stage 82 along x- and y-axes 62, 64 and about z-axis 66 as required to compensate for movement of camera 30 as determined by correlator 44. It is noted that VCM 86 provides an equal impetus to VCM 106 and VCM 88 provides an equal impetus to VCM 108 when there is no rotational motion of camera 30 detected and unequal impetuses when rotational motion is required to be countered.

As illustrated, flexure stage 82 and associated VCMs 86, 88, 106, and 108 are intended as simplified representations of known nanopositioning systems. While such nanopositioning systems may vary, controller 80 can be readily modified to convert displacement signal 60 to compensation signals (e.g. compensation signals 90, 92, 110, and 112) as required so as to be suitable for use with a given nanopositioning system.

Figure 6:
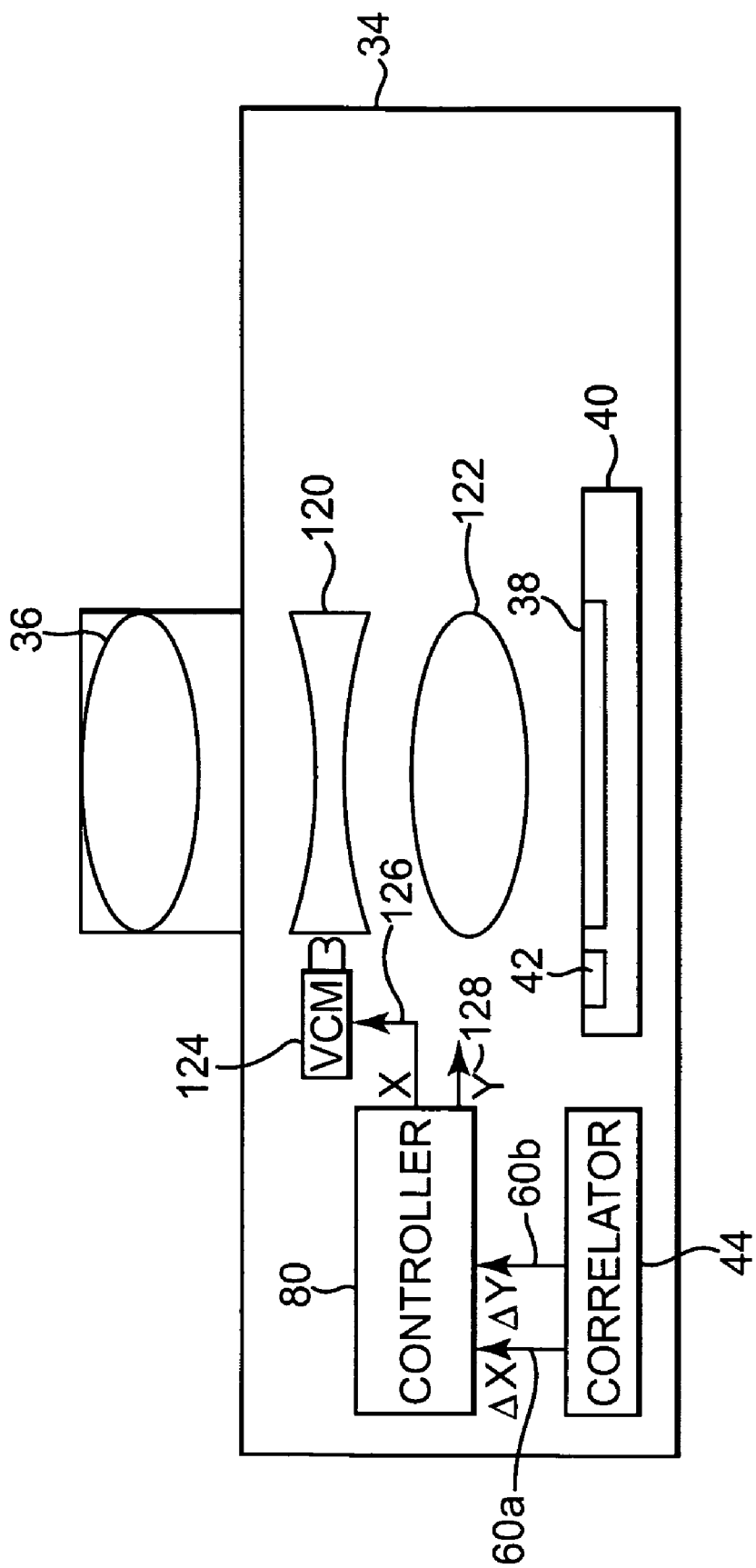
FIG. 6 is a block and schematic diagram illustrating generally one embodiment of a blur reduction system according to the present invention.

FIG. 6 is a block diagram illustrating generally one embodiment of camera 30 according to the present invention wherein compensator 46 includes controller 80 and a pair of compensation lenses 120 and 122. In one embodiment, as illustrated, compensation lens 120 comprises a moveable concave lens and compensation lens 122 comprises a fixed-mounted convex lens element. Compensator 46 includes a first VCM 124 configured to move concave lens 120 along x-axis 62 and a second VCM (not illustrated) configured to move concave lens 122 along y-axis 64. In the embodiment of FIG. 6, semiconductor substrate 40 is fixed-mounted with respect to housing 34.

In a fashion similar to that described above with respect to FIGS. 3A and 3B, correlator 44 compares consecutive images received from navigation array 44 and provides displacement signal 60 having a first displacement component 60a (Δx) and a second displacement component 60b (Δy) respectively indicative of incremental movement of camera 30 along x-axis 62 and y-axis 64. In response, controller 60 provides compensation signals 126 and 128 that respectively cause the first and second VCMs to move concave lens 120 along x- and y-axes 62, 64 by distances required to offset movement of camera 30 detected by correlator 44. Primary array 38 and navigation array 38 remain stationary. By controlling the movement of concave lens element 290 to counter the movement of camera 230, concave lens element 290 and fixed-mounted convex lens element 292 work together to translate the light received via camera objective 236 relative to image plane 234 such that the image ream remains substantially stationary relative to image plane 234.

Figure 7:
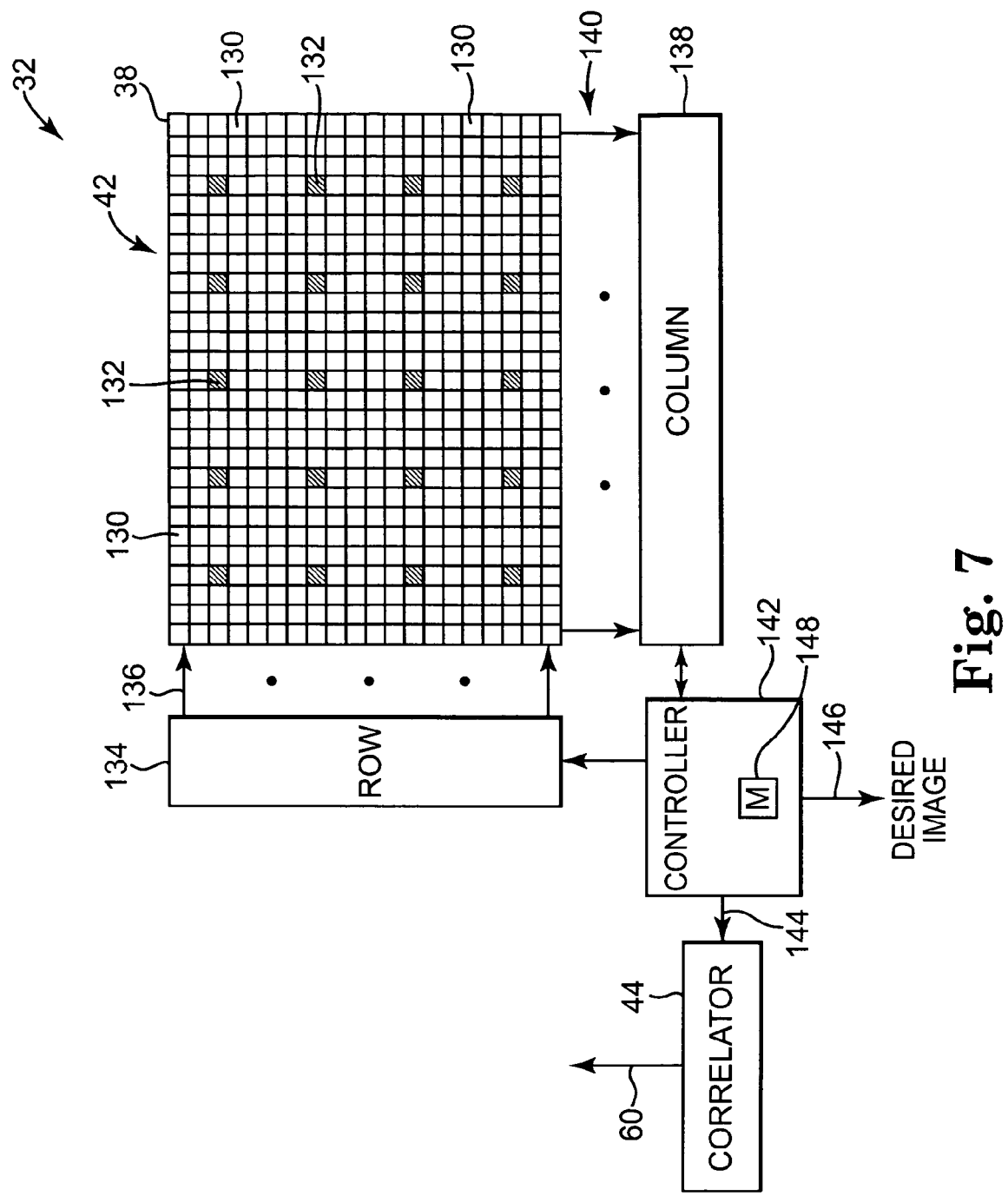
FIG. 7 is a block and schematic diagram illustrating generally portions of one embodiment of a blur reduction system wherein a navigation array is embedded within a primary array.

FIG. 7 is a block diagram illustrating generally portions of one embodiment of blur reduction system-32 where navigation array 42 comprises a subset of (i.e. is embedded within) primary array 38 in semiconductor substrate 40. Primary array 38 includes a plurality of pixels 130 arranged into rows and columns. In one embodiment, as illustrated, a plurality of pixels 132 ("shaded" pixels) of primary array 38 are selected to form navigation array 42. In one embodiment, as illustrated, pixels 132 are selected so as to form a grid-like pattern which is evenly distributed across primary array 38. In one embodiment, pixels 132 of navigation array 42 comprise black and white pixels (i.e. no color filters) while pixels 130 of primary array 38 provide color images (i.e. include color filters).

Each row of pixels is coupled to a row select circuit 134 via row signal lines 136 and each column of pixels is coupled to column select and readout circuit 138 via output lines 140. A controller controls the readout of charges accumulated by primary and navigation pixels 130 and 132 by selecting and activating appropriate row signal lines 136 and output lines 140 via row select circuit 134 and column select and readout circuit 138. In a typical imaging array, pixel readout it generally carried out in row-by-row fashion, with all pixels of a selected row being simultaneously activated by the corresponding row select line and the accumulated charges of the pixels of the selected row being read out through sequential activation of column lines 140 by column select and readout circuit 138.

According to the present invention, however, pixels 132 forming navigation array 40 are read out at a higher temporal resolution by controller 142 than pixels 130 forming primary array 38. In one embodiment, for example, controller 142 is configured to read out pixels 132 forming navigation array 40 ten times during the integration period of pixels 130 forming primary array 38. By reading out pixels 132 in this fashion, navigation array 42 embedded within primary array 38 acquires and provides a series of low-resolution images during the integration period of primary array 38. Controller 142 provides the series of low-resolution images to correlator 44 via a signal path 144 which, in-turn, provides displacement signal 60 based on the series of images as described above with regard to FIGS. 3A and 3B.

In one embodiment, pixels 132 can arranged and readout by controller 142 in a fashion so as to form a pair of navigation arrays opposite each other relative to a center of primary array 38, with each providing a series of low-resolution images. In such an embodiment, correlator 60 is configured to provide displacement signal 60 indicative of both translational and rotational movement of the associated camera in a fashion similar to that described above with regard to FIG. 5.

At the completion of the integration period, controller reads the accumulated charges of pixels 130 of primary array 38 and provides pixel data representative of a desired image via a signal path 146. However, since each of the multiple readouts of pixels 132 forming navigation array 42 during the integration period of primary array 38 is a "destructive" read, the pixel positions of the desired image at 146 which correspond to pixels 132 of navigation array 40 will have inaccurate data and form "holes" within the desired image.

As such, in one embodiment, controller 142 accumulates data (i.e. sums) in a memory 148 for each pixel 132 each time it is read during the integration period of primary array 38. At the completion of the integration period of primary array 38, controller 142 inserts the "summed" values of each pixel 132 of navigation array 42 at the corresponding pixel position in the desired image at 146. In one embodiment, controller 146 is configured to average the accumulated values of the pixels 130 of primary array 38 neighboring each pixel 132 of navigation array 42 and to insert the "averaged" value of the corresponding pixel position in the desired image at 146. Any number of other methods can also be employed to fill-in the "missing" pixel data in the desired image acquired by primary array 38 caused by the destructive read-outs of pixels 132 forming navigation array 42.

Figure 8:
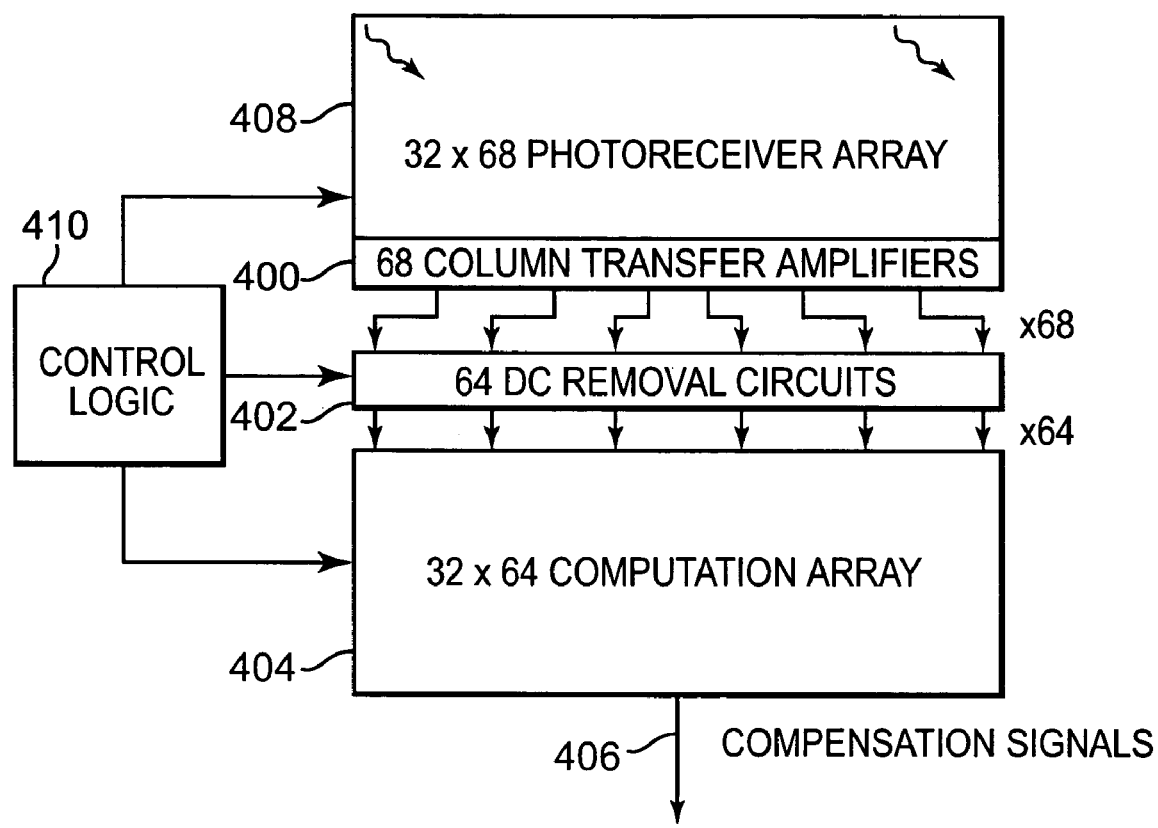
FIG. 8 is a block diagram illustrating one embodiment of a navigation array and correlator according to the present invention.

FIG. 8 is a block diagram illustrating an example embodiment of navigation array 42 and correlator 44 in accordance with the present invention which is configured to acquire and correlate two-dimensional images, and to provide compensation signals to counter motion of an associated imaging device, such as camera 30, detected through the correlation process. In the illustrated embodiment, navigation array 42 comprises a thirty-two row by sixty-eight column array of photoelements 408 and an array of sixty-eight column transfer amplifiers 400, and correlator 44 comprises an array of sixty-four DC removal circuits 402, a computational array 404, and control logic 410.

Transfer amplifiers 400 transfer signals in a row-to-row fashion from navigation array 408 to DC removal circuits 402. Computational array 404 receives data from the DC removal circuits 402 and performs computations on the data to provide replacement signals at 406 (e.g. first and second displacement components 60a and 60b of FIGS. 3A and 3B) to a compensator system (e.g. compensator 46 of FIG. 1) which opto-mechanically counters the motion of the associated imaging device based on compensation signals 406.

In the absence of cell-by-cell calibration of a conventional integrated light sensor, some variations in sensitivity will occur as a result of limitations of integrated circuit processing technology. Correlator 44, as illustrated by FIG. 8, calculates correlations between a first or reference image and a second image subsequently captured at a different location relative to navigation array 408. Any variations in illumination and photoelement sensitivity will degrade the correlation signal. Consequently, the spatial DC removal circuits 402 of FIG. 8 have been configured to maintain the integrity of the correlation signals, while keeping the cost of the system relatively low. Low spatial frequency changes in illumination and photoelement sensitivity which would otherwise corrupt the correlation signal are removed from the navigation image.

An understanding of the operation of the DC removal circuits 402 is not critical to a full understanding of the operation of the computational array 404, and is therefore not described in detail. However, it is useful to understand the basic operation of the column transfer amplifiers 400.

Figure 9:
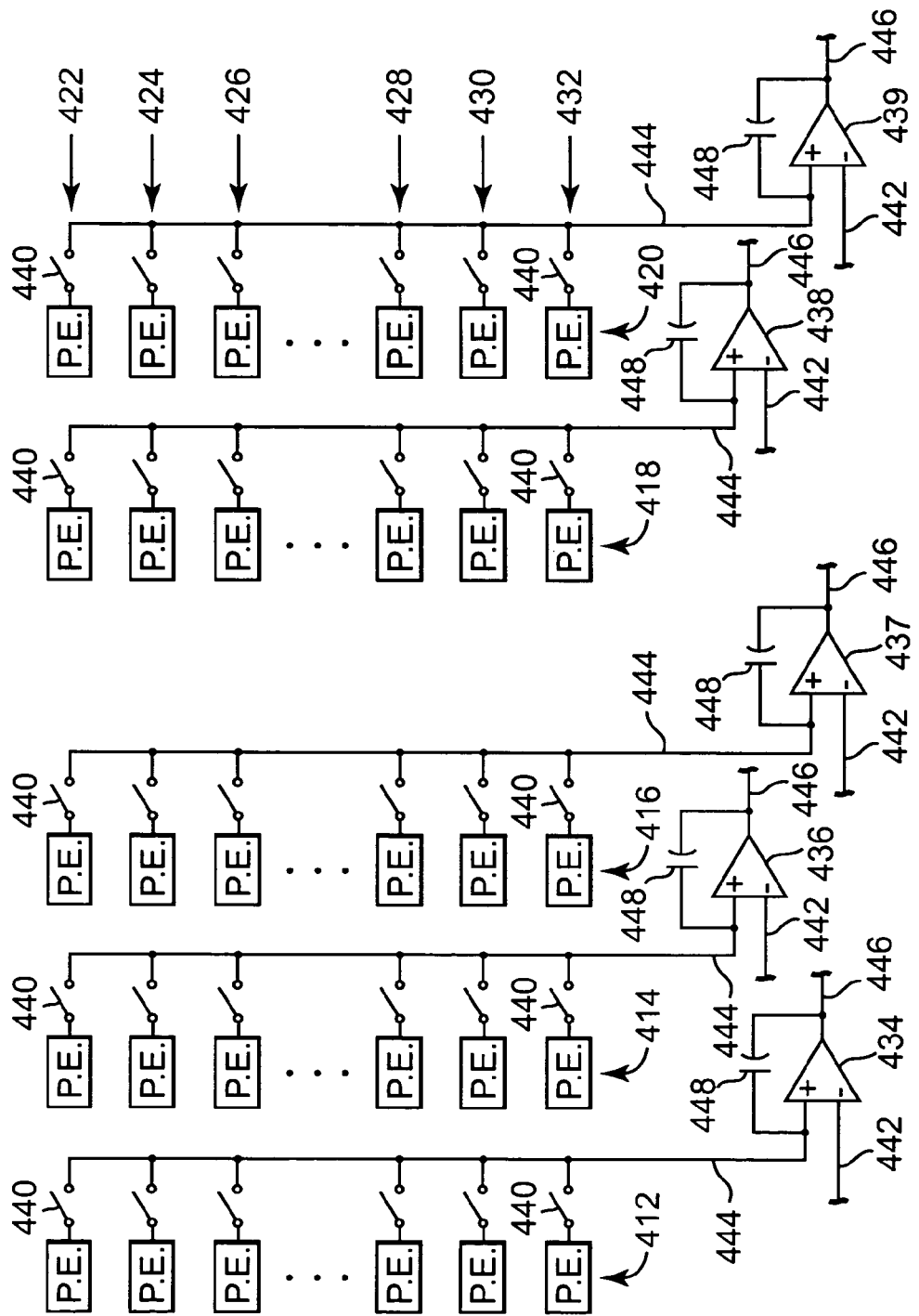
FIG. 9 is a block and schematic illustrating portions of the navigation array and correlator of FIG. 8.

Referring to FIG. 9, five columns 412, 414, 416, 418 and 420 of the sixty-eight columns of photoelements are shown. For each of the columns, six of the thirty-two rows 422, 424, 426, 428, 430 and 432 are represented. Each column is operatively associated with a separate transfer amplifier 434, 436, 437, 438 and 439. A photoelement in a column is connected to the operatively associated transfer amplifier by closing a read switch 440. In the operation of the circuitry of FIG. 9, no two photoelements are connected to the same transfer amplifier simultaneously.

Each transfer amplifier 434-439 operates as an integrator and includes an input 442 that is connected to a source of a fixed voltage. A second input 444 is capacitively connected to the output 446 of the transfer amplifier by a transfer capacitor 448.

In the operation of the circuit of FIG. 9, the read switches of the first row 422 of photoelements may be closed, so that each transfer capacitor 448 receives a charge corresponding to the light energy that is received at the associated photoelement in the first row. The received charge is transferred to subsequent processing circuitry via the output lines 446. The readout of a single row is estimated to be between 200 ns and 300 ns. Following the readout of the first row, the read switches of the first row are opened and the transfer amplifiers are reset. The read switches of the second row 424 are then closed in order to transfer the signals from the photoelements of the second row. The process is repeated until each row of photoelements is read.

By the operation of the transfer amplifiers 434-439 of FIG. 9, photoelement signals are transferred in a row-by-row fashion to subsequent circuitry. The DC removal circuits 402 of FIG. 8 continue the parallel processing of photoelement signals, as established by the column transfer amplifiers. The DC removal circuits output sixty-four signals and are representative of light energy received at the navigation sensor 408. In the embodiment of FIG. 8, a frame of signals is comprised of pixel values at the computational array, with the pixel values being acquired by thirty-two transfers of sixty-four signals from the DC removal circuits.

Figure 10:
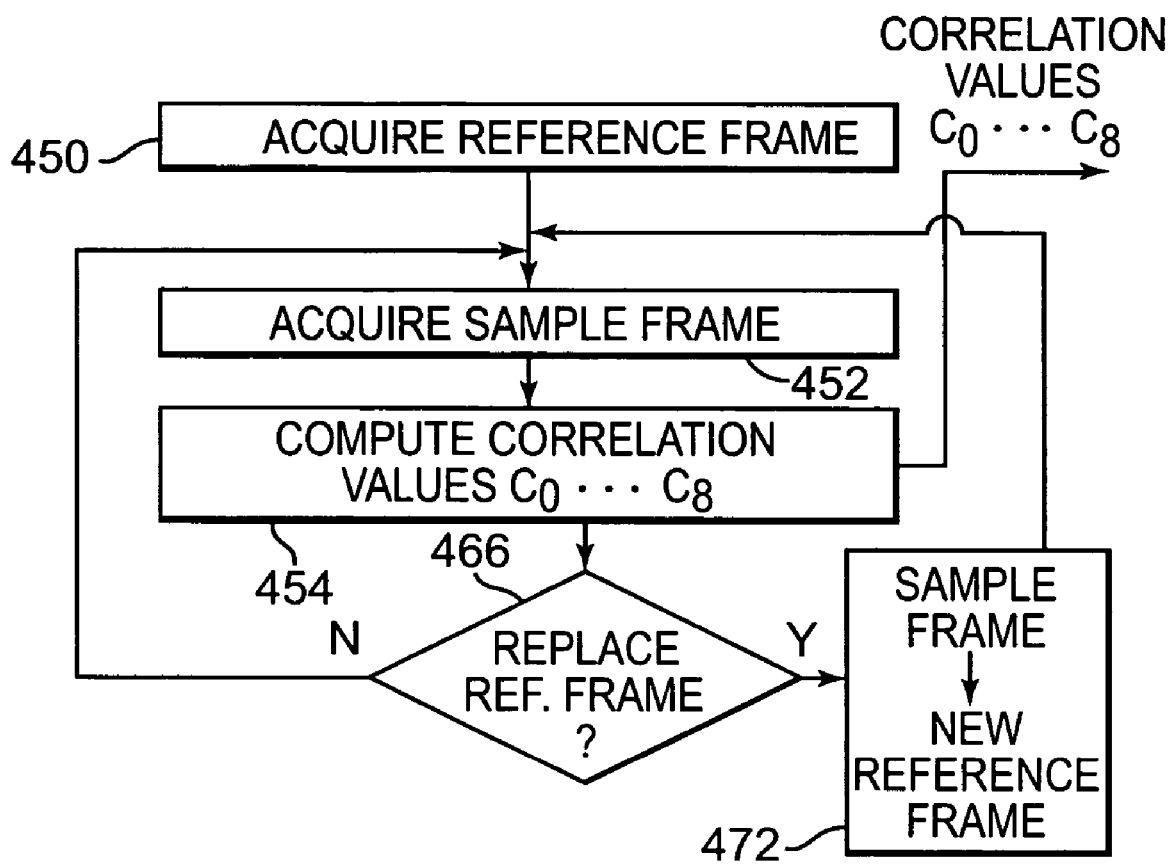
FIG. 10 illustrates one embodiment of a process employed by blur reduction system according to the present invention for detecting motion via image correlation.

FIG. 10 illustrates one embodiment of a process employed by a correlator according to the present invention, such as correlator 44, for detecting movement of an associated imaging device, such as camera 30 (see FIG. 1). While the invention will be described with reference to processing photoelement signals indicative of features of a selected scene or environment within a field of view of the navigation array, the method is not restricted to any one application.

The process is performed to correlate a reference frame of features of the environment to subsequent frames of the environment. In effect, the correlations compare the positions of the imaged features which are common to reference frame and the subsequent frames to provide information related to movement of the associated imaging device in the time interval between acquisition of the reference frame and the subsequent frame.

Initially, at 450, a reference frame of signals (i.e. a reference image) is acquired. The reference frame may be considered to be a start position. The position of the navigation array relative to an imaged region at a later time may be determined by acquiring 452 a sample frame of signals from the navigation array at the later time and then computing correlation values 454 with respect to the reference frame and the later-acquired sample frame.

Acquiring the initial reference frame 450 may take place upon initiation of the imaging process. For example, in one embodiment, as mentioned earlier, the acquisition may be triggered by depressing a shutter control button of the associated imaging device, such as shutter control button 68 of FIG. 2.

While the detection of motion is performed computationally, the concepts of this embodiment may be described with reference to the conceptual view of FIG. 11. A reference frame 456 of 7×7 pixels is shown as having an image of a T-shaped feature 458. At a later time (dt) gyroscope image sensor 408 acquires a second or sample frame 460 which is displaced with respect to frame 456, but which shows substantially the same features. The duration dt is preferably set such that the relative displacement of the T-shaped feature 458 is less than one pixel of the navigation sensor at the velocity of translation of the associated imaging device, such as camera 30.

If the imaging device has moved during the time period between acquiring the reference frame 456 of signals and acquiring the sample frame 460 of signals, the T-shaped feature will be shifted. While the preferred embodiment is one in which dt is less than the time that allows a full-pixel movement, the conceptual representation of FIG. 11 shows that the feature 458 has shifted upwardly and to the right by one full pixel. The full-pixel shift is assumed only to simplify the representation.

Figure 11:
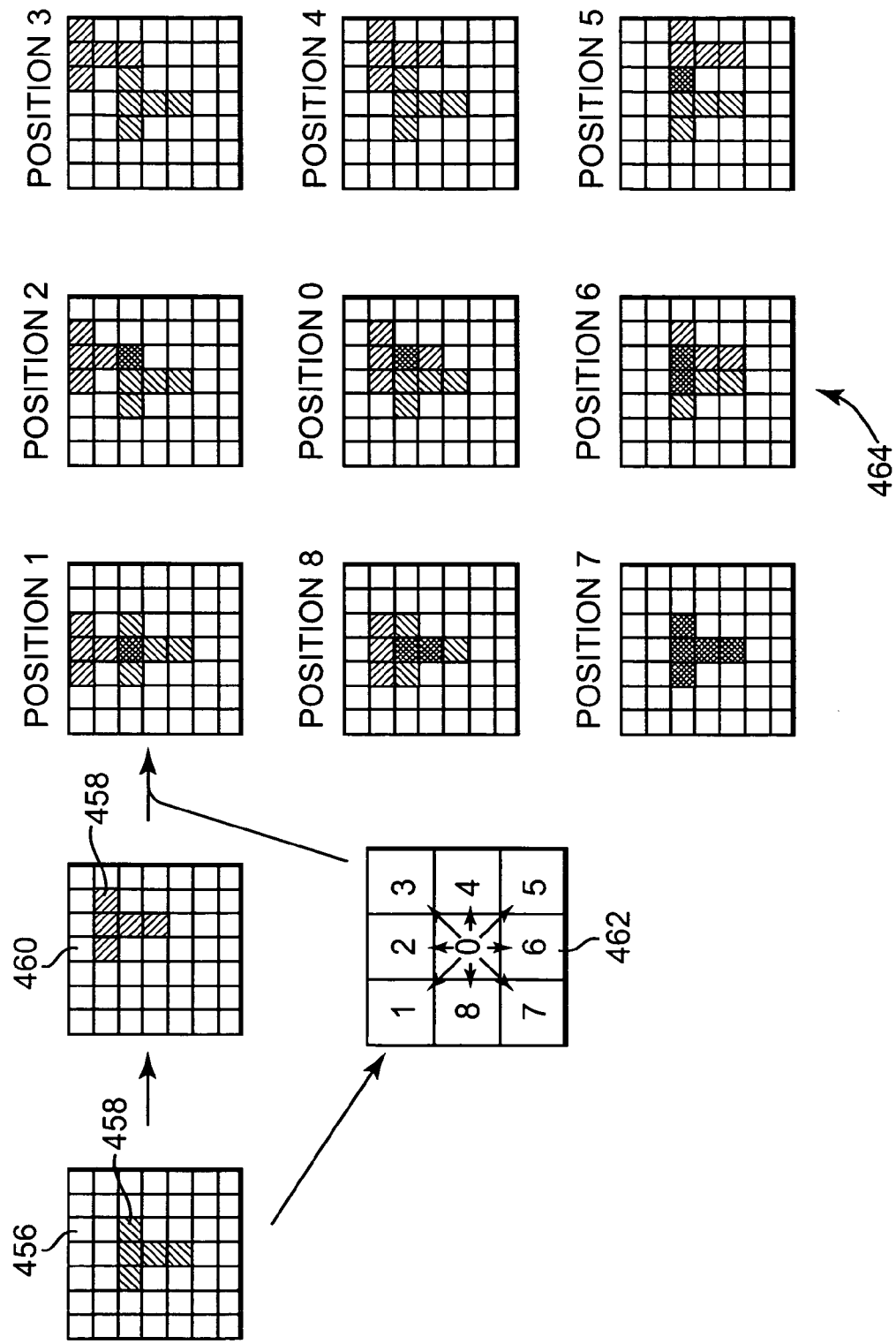
FIG. 11 is a schematic representation of portions of the process of FIG. 10.

Grid 462 in FIG. 11 represents sequential shifts of a pixel value of a particular pixel within the 7×7 array of frame 460.

The sequential shifts are individual offsets into the eight nearest-neighbor pixels. That is, step "0" does not include a shift, step "1" is a diagonal shift upward and to the left, step "2" is an upward shift, etc. The shifts are performed simultaneously for all of the pixels of the sample frame 460. In this manner, the nine pixel-shifted frames can be combined with the reference frame 456 to produce the array 464 of position frames. The position frame designated as "Position 0" does not include a shift, so that the result is merely a combination of frames 456 and 460. "Position 7" has the minimum number of shaded pixels, and therefore is the frame with the highest correlation. Based upon the correlation results, the position of the T-shaped feature 458 in the sample frame 460 is determined to be a diagonal rightward and upward shift relative to the position of the same feature in earlier-acquired reference frame 456, which implies that the imaging device has moved down and to the left during time dt.

While other correlation approaches may be employed, an acceptable approach is a "sum of the squared differences" correlation. For the embodiment of FIG. 13, there are nine correlation coefficients ($C_k = C_0, C_1 \ldots C_8$) formed from the nine offsets at member 462. Another option regards the shifting of the sample frame 460, since the correlation operates equally well by offsetting the reference frame 456 and leaving the sample frame un-shifted.

Correlations are used to find the locations of features 458 common to reference frames 456 and sample frame 460 in order to determine the displacements of the features. As described above, such as by FIGS. 3A and 3B for example, the position of the primary and navigation arrays 38 and 42 are adjusted so as to counteract the motion detected by the correlation of subsequent sample frames to reference frame 456. While the process provides a high degree of correlation, errors, even though they may be minor, can accumulate over time as each successive sample frame 460 is compared to reference frame 456. If allowed to accumulate over too long a period of time, such errors may lead to poor counteracting of the detected motion and, consequently, to poor stabilization of the image. This is particularly true of the open-loop stabilization system 275 illustrated by FIG. 4.

In light of the above, in one embodiment, if too long a time duration has passed since the initial reference-frame 456 was acquired without a photo being taken by camera 30, a new reference frame 456 is acquired. Additionally, in one embodiment, if a user of camera 30 greatly shifts the camera such that there are no common features between sample frame 460 and reference frame 456, a new reference 456 is acquired.

As such, with reference again to FIG. 10, at 466 a determination is made following each computation of the correlation values at 454 as to whether to replace the reference frame prior to subsequent correlation processing. If it is determined that the reference frame is not to be replaced, a determination is made at step 468 as to whether to translate the signals, i.e., the pixel values, of the reference frame. If the determination is made not to replace the reference frame 456, the process returns to 452 to acquire a next sample frame and the process continues. If the determination is made to replace the reference frame, the sample frame 460 in FIG. 11 becomes the new reference frame, as shown at 472 in FIG. 10. A next sample frame is then acquired at 452 and the process continues.

By determining the change in positions of common features between the reference frame and the sample frame, the relative movement between navigation array 408 and the environment being imaged is detected. Based on the movement detected by the correlation, the correlator, such as correlator 44, provides compensation signals 406 to control compensation measures which counteract the detected motion and maintain a substantially fixed relationship between a selected scene being imaged and a primary array, thereby reducing image blur.

Figure 12:
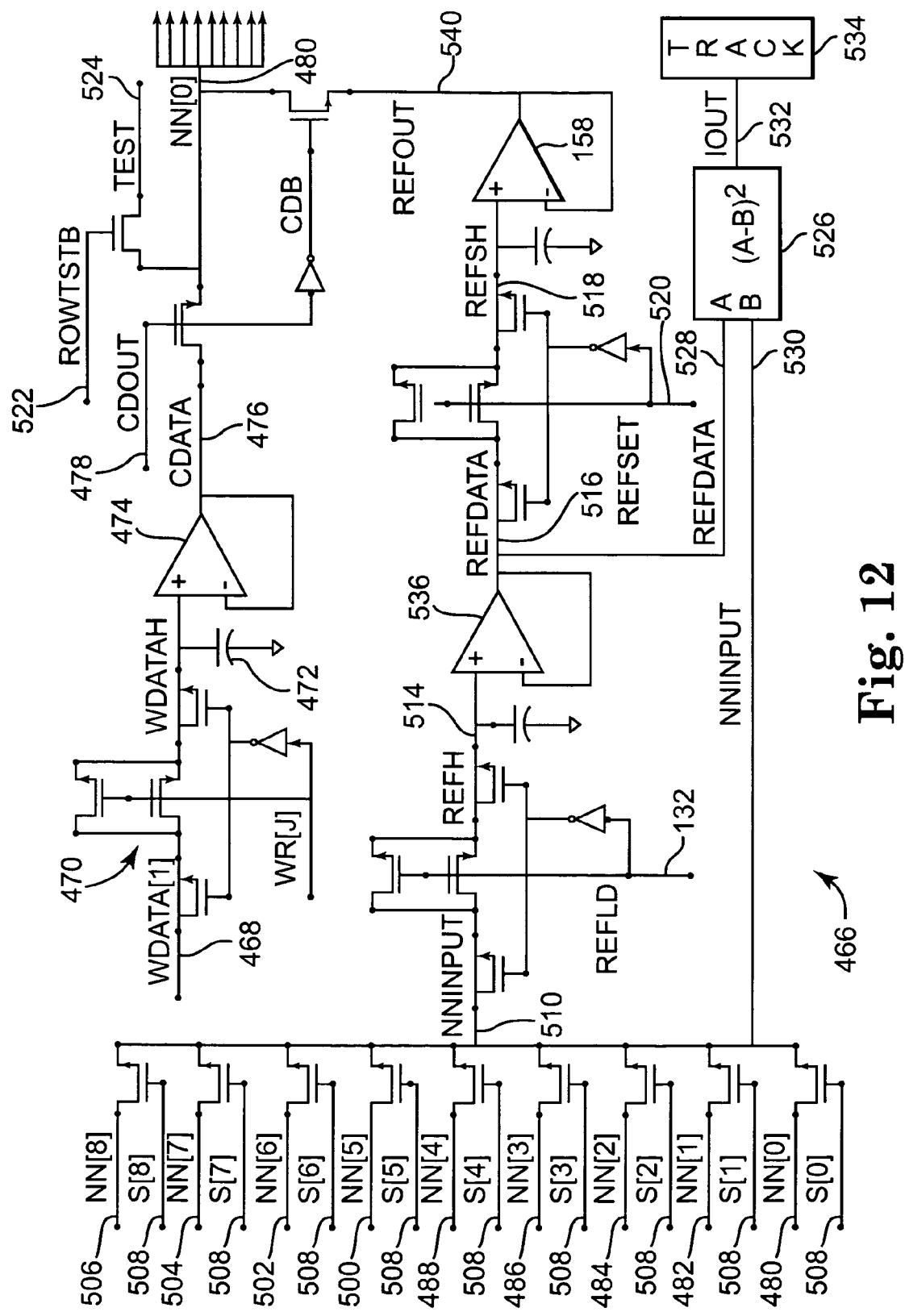
FIG. 12 is a schematic diagram of an example embodiment of an individual cell within the computational array of FIG. 8.
Figure 5:
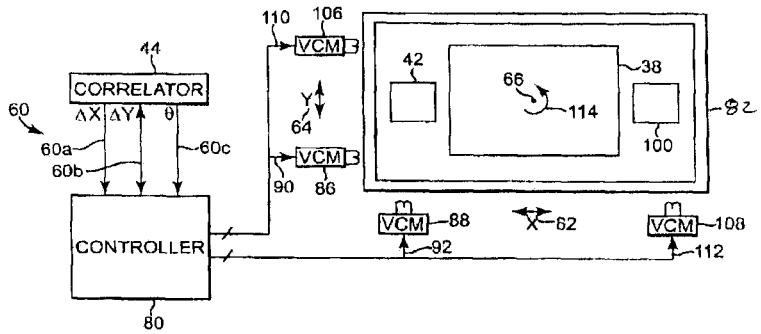

FIG. 12 is a schematic diagram of an individual cell within the computational array 404 of FIG. 8. However, as will be understood by persons skilled in the art, other circuits may be used to carry out the process described with reference to FIGS. 10 and 11.

Image data WDATA(i) is representative of light energy from a particular photoelement loaded into the computational cell 466 at line 468, with a charge compensated transistor switch 470 under the control of a WR(j) signal. After the WR(j) signal is deasserted, the new data is held on capacitor 472 and is buffered by an amplifier 474. The computational cell is a data cell within a two-dimensional array of cells. Referring briefly to FIG. 11, the cell may be used to store pixel values and to shift the pixel values for a single pixel in the 7×7 array that comprises frames 456 and 460. The CDATA node 476 of FIG. 12 is one CDATA node within the computational array that permits simultaneous signal processing of all pixels of a frame of signals. Initially, the array of CDATA nodes collectively forms the comparison image, or "reference frame." As will be explained below, the CDATA nodes subsequently form the sample frame. Control input CDOUT 478 selects signal CDATA, comparison data, or selects REFOUT for the nearest-neighbor output node NN(0) 480.

The nearest-neighbor inputs NN(0)-NN(8) 480, 482, 484, 486, 488, 500, 502, 504 and 506 are separately selected by means of switch control signals S(0)-S(8) on lines 508. The NN(0)-NN(8) inputs 480-506 are the outputs of the nearest-neighbor cells according to the pixel map 462 of FIG. 11. Consequently, the node 480 is shown both as an output that fans out for connection to nearest-neighbor cells and as an input for the cell 466. The switch control signals are generated by a 4-9 encoder, not shown, that is external to the computational array. The 4-bit input to the encoder is referred to as the nearest-neighbor address and takes on binary values from 0000(0) to 1000(8).

The nearest-neighbor input (NNINPUT) node 510 is sampled by pulsing REFLD 512, thereby storing the NNNPUT on node REFH 514. Similarly, REFDATA 516 can be sampled and held on REFSH 518 by pulsing REFSFT 520.

For testing, ROWTSTB 522 can be asserted, allowing the NN(0) signal to propagate to the TEST output 524. The TEST signals from each cell in a row of cells connect to common vertical buses in each column of the computational array and are multiplexed at the bottom of the array and driven off-chip. A standard row decoder along the left edge of the array allows selection of a particular row for test. However, the test feature is not critical to the invention.

Each computation cell 466 in the array of cells has a circuit 526 that determines the correlation values identified in FIG. 10 with reference to step 454. A first input 528 receives the reference data from REFDATA node 516. A second input 530 provides the nearest-neighbor input NNINPUT selected by the appropriate switch control signal at lines 508. The output 532 of the correlation cell is a current. All of the correlation outputs in the computational array are summed together in a single off-chip summing resistor of a tracking circuit 534. The voltage developed across the summing resistor is referred to as the correlation values in FIG. 12.

In the embodiment of FIG. 12, the circuit 526 is based on a squared-difference calculation. The cell 466 may be modified to provide product-based correlations without modifying the basic architecture of the array Control inputs S(0)-S(8), REFLD, REFSFT and CDOUT are global to the entire array.

It is important to understand the relationship between the nearest-neighbor map represented by 462 in FIG. 11 for a single cell and for the array as a whole. Location 0 of an image refers to the present location of the image. When referring to the movement of an image from location 0 to location 1, the representation is that the image signals in all of the cells of the array are moved to the neighbor cell that is to the left and upward. That is, the movement is relevant to a single cell in the computational array and is relevant to every cell in the array.

The computational array functionality can be described in terms of image acquisition, reference image load, and correlation computation. Image acquisition refers to the loading of new image signals via the WDATA line 468 of each computation cell 466. In the present implementation, every 40 microseconds a new frame of signals, i.e., pixel values, is acquired from the photoelement array via the column transfer amplifiers and the DC removal amplifiers.

The process of loading a new image is referred to as a "frame transfer." Frame transfer takes approximately 10 microseconds to complete. The frame transfer control circuit asserts a signal FTB, not shown, during frame transfer. The operations of the computation array described below are coordinated with the frame transfer process by observing and synchronizing with the FTB signal. The validity of a new comparison image is signaled by the falling edge of the FEB signal. The operations described-below are only appropriate when FTB is not asserted.

Loading a reference frame of pixel values is required before any image correlations can be calculated. To load the reference frame, all of the signals at the CDATA nodes 476 in the computational array must be transferred to the REFH nodes 514. This is accomplished by setting CDOUT 478 and S(0) high, and pulsing the REFLD signal on line 512.

After a reference frame has been loaded, the computational array is ready to compute correlations. Correlations between the reference frame of pixel values and the subsequent sample frame are computed by setting the nearest-neighbor address to the desired value and recording the resulting voltage developed across the summing resistor of the displacement tracking circuit 534. When the photoreceiver array has moved a single pixel distance from the location at which the reference frame was acquired, a strong correlation will be detected at one of the nearest-neighbor locations, since there will be a minimal level of output current. In FIG. 11, the correlation is detected to be at POSITION 7 in the array 464. Sub-pixel movements can be determined by interpolating from multiple current-output readings in two-dimensional correlation space. It should be noted that correlations between the reference frame and itself can be computed by setting CDOUT 478 low and pulsing REFSFR 520. This causes the nearest-neighbor inputs to come from the reference frame, rather than from the sample frame.

It is noted that FIGS. 8 through 12 above describe only one example embodiment of navigation array 42 and correlator 44 according to the present invention. Other circuit configurations and processes can be employed by blur reduction system 32 to acquire and correlate images to detect motion. Additionally, although described herein primarily with respect to still cameras, the teaching of the present invention can be readily adapted for application in camcorders and other imaging apparatuses providing motion pictures. For example, when applied to camcorders, the navigation array and correlator can be configured to update the reference frame as the camcorder pans across a selected scene and can be configured to include filtering to discriminate between intentional motion caused by panning of the camcorder or moving objects with the scene and unintentional motion, such as that caused by human muscle tremor.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An imaging device comprising:
   a lens configured to focus light from a selected scene within an optical footprint;
   a substrate including:
   a primary array configured to acquire a desired image corresponding to a portion of the selected scene during an integration period; and
   at least one navigation array configured to acquire a series of images during the integration period including a first image and a second image having common features from the selected scene, wherein the imaging array and the at least one navigation array are positioned within the optical footprint;
   a correlator configured to receive the series of images from the at least one navigation array, to determine location differences of the common features of the first and second images relative to the at least one navigation array, and to provide a displacement signal indicative of imaging device translation in two planar dimensions during an interval between the first and second images based on the location differences;
   a compensator configured to opto-mechanically maintain one of: a substantially fixed relationship or a constant movement indicative of a panning movement of the imaging device between the selected scene and the primary array based on the displacement signal;
   a memory configured to store at least one of the series of images from the navigation array acquired during the integration period; and
   a processor, coupled to the primary array and the memory and configured to generate a composite image from the desired image from the primary array and the at least one of the series of images stored in the memory.

2. The imaging device of claim 1, wherein the primary array and at least one navigation array comprise separate arrays each having associated readout circuitry.

3. The imaging device of claim 1, wherein pixels of the at least one navigation array are readout at a rate that is from ten to one hundred times faster than pixels of the primary array.

4. The imaging device of claim 1, wherein the at least one navigation array has a lower spatial resolution than the primary array.

5. The imaging device of claim 1, wherein the at least one navigation array comprises a black and white array.

6. The imaging device of claim 1, wherein the at least one navigation array includes a first navigation array configured to acquire a first series of images and a second navigation array configured to acquire a second series of images during the integration period, the first and second series each including a first image and a second image having the common features from the selected scene.

7. The imaging device of claim 6, wherein the correlator is configured to provide the displacement signal indicative of translation and rotation of the imaging device in the two planar dimensions based on location differences of the common features of the first and second images of the first series relative to the first navigation array and on location difference of the common features of the first and second images of the second series relative to the second navigation array.

8. The imaging device of claim 1, wherein the at least one navigation comprises a subset of the primary array with each sharing common readout circuitry.

9. The imaging device of claim 8, wherein accumulated charges of each pixel of the at least one navigation array are readout during the integration period of the primary array and summed to form pixel values for corresponding pixels of the desired image.

10. The imaging device of claim 8, wherein only pixels in the primary array include color filters.

11. The imaging device of claim 1, wherein the at least one navigation array comprises a plurality of navigation arrays positioned in the substrate within the optical footprint.

12. The imaging device of claim 1, wherein the compensator comprises a moveable flexure stage on which the substrate is positioned.

13. The imaging device of claim 1, wherein the compensator comprises a moveable lens positioned between the lens and the optical footprint.

14. The imaging device of claim 1, wherein:
the memory accumulates the data from the series of images from the navigation array acquired during the integration period; and
the processor generates the composite image from the image from the primary array and the accumulated data from the series of images stored in memory.

15. The imaging device of claim 1, wherein responsive to the imaging device capturing a panned image, the navigation array and correlator are configured to adjust a location of the common features of the first image as the imaging device pans across the scene to provide an adjusted displacement signal.

16. The imaging device of claim 1, wherein the compensator adjusts both a position of the lens and a position of the substrate to maintain one of the substantially fixed relationship or the constant movement between the selected scene and the primary array.

17. A method of operating an imaging device receiving light from a selected scene within an optical footprint;
positioning a primary array and at least one navigation array on a common substrate within the optical footprint;
acquiring, with the primary array, a desired image of a portion of the selected scene during an integration period;
acquiring, with the at least one navigation array, a series of images during the integration period, the series including a first image and a second image having common features from the selected scene;
determining location differences of the common features of the first and second images relative to the at least one navigation array;
generating a displacement signal indicative of imaging device translation in two planar dimensions during an interval between the first and second images based on the determined location differences; and
opto-mechanically maintaining a substantially fixed relationship between the selected scene and the primary array based on the displacement signal;
storing, in a memory, at least one of the series of images from the navigation array acquired during the integration period; and
generating, by a processor, a composite image from the desired image from the primary array and the at least one of the series of images stored in memory.

18. The method of claim 17, wherein the positioning of the primary array and the at least one navigation array includes positioning the primary array and the at least one navigation array as separate arrays on the substrate.

19. The method of claim 17, wherein a the positioning of the at least one navigation array includes positioning the at least one navigation array as a subset of the primary array.

20. The method of claim 17, wherein the positioning of the at least one navigation array includes positioning a first navigation array and a second navigation array each acquiring during the integration period a series of images including a first image and a second image having the common features from the selected scene.

21. The method of claim 17, wherein the determining of the location differences includes determining the location differences of the common features of the first and second images of a first series relative to the first navigation array and the location differences of the common features of the first and second images of a second series relative to the second navigation array.

22. The method of claim 21, wherein the generating of the displacement signal based on the location differences includes generating the displacement signal indicative of imaging device translation and rotation in two planar dimensions.

23. An imaging device comprising:
means for receiving light from a selected scene;
means, on a substrate, for acquiring a desired image of a portion of the selected scene during an exposure period;
means, on the substrate, for acquiring a series of images during the exposure period, the series including a first image and a second image having common features from the selected scene;
means for determining location differences of the common features of the first and second images;
means for maintaining a substantially fixed relationship between the selected scene and the substrate based on the location differences;
means for storing at least one of the series of images from the navigation array acquired during the exposure period; and
means for generating a composite image from the desired image of the portion of the selected scene and the at least one of the series of stored images.

24. The imaging device of claim 23, including means for generating a displacement signal indicative of imaging device translation in two planar dimensions during an interval between the first and second images based on the location differences, wherein the maintaining of the substantially fixed relationship between the selected scene and the substrate is based on the displacement signal.

* * * * *

UNITED STATES PATENT AND TRADEMARK OFFICE
CERTIFICATE OF CORRECTION

PATENT NO.        : 7,598,979 B2                                           Page 1 of 2
APPLICATION NO. : 11/232319
DATED             : October 6, 2009
INVENTOR(S)       : William R. Trutna, Jr. and Peter David Cooper It is certified that error appears in the above-identified patent and that said Letters Patent is hereby corrected as shown below:

Drawings: Insert reference number --82--

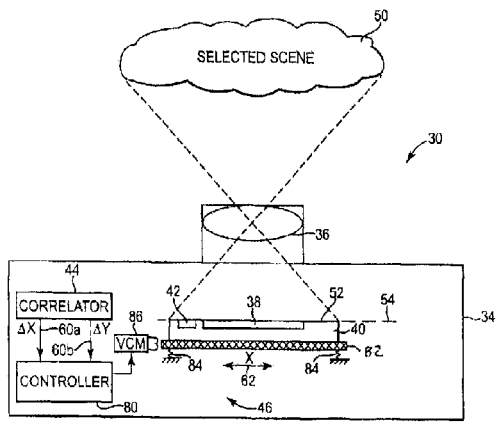

Fig. 3A

Drawings: Insert reference number --82--

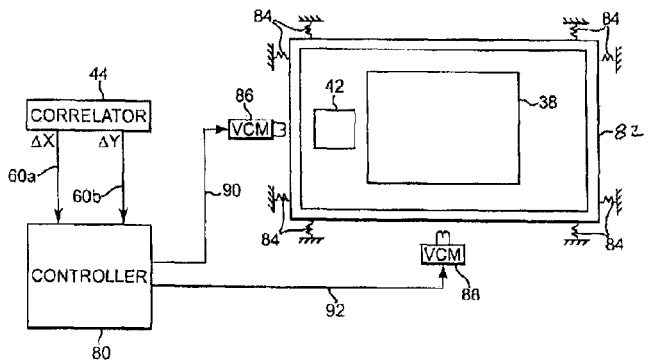

Fig. 3B

Signed and Sealed this

Tenth Day of August, 2010

David J. Kappos
*Director of the United States Patent and Trademark Office*

Drawings: Insert reference number --82--